United States Patent
Kabrt et al.

(10) Patent No.: US 9,911,344 B2
(45) Date of Patent: Mar. 6, 2018

(54) HELICOPTER LANDING SYSTEM USING A CAMERA FOR OBSTACLE DETECTION

(71) Applicant: Honeywell International Inc., Morristown, NJ (US)

(72) Inventors: Tomas Kabrt, Prague (CZ); George Papageorgiou, Toulouse (FR); Jean-Luc Derouineau, Cornebarrieu (FR); Tomas Marczi, Beroun (CZ); Michal Orlita, Brno (CZ)

(73) Assignee: Honeywell International Inc., Morris Plains, NJ (US)

( * ) Notice: Subject to any disclaimer, the term of this patent is extended or adjusted under 35 U.S.C. 154(b) by 287 days.

(21) Appl. No.: 14/808,947

(22) Filed: Jul. 24, 2015

(65) Prior Publication Data
US 2017/0025024 A1   Jan. 26, 2017

(51) Int. Cl.
| | | |
|---|---|---|
| G06K 9/00 | (2006.01) |
| G08G 5/04 | (2006.01) |
| G06K 9/20 | (2006.01) |
| G06T 7/593 | (2017.01) |

(Continued)

(52) U.S. Cl.
CPC .............. *G08G 5/04* (2013.01); *B64C 27/04* (2013.01); *B64D 47/08* (2013.01); *G06K 9/00624* (2013.01); *G06K 9/00664* (2013.01); *G06K 9/2018* (2013.01); *G06T 7/593* (2017.01); *G06T 2207/10012* (2013.01); *G06T 2207/10021* (2013.01); *G06T 2207/10028* (2013.01); *G06T 2207/10032* (2013.01); *G06T 2207/30261* (2013.01)

(58) Field of Classification Search
CPC ........ G02B 2027/0138; G06K 9/00624; B60R 21/01538; B60R 2001/1253; B60R 25/04; B60R 25/305
See application file for complete search history.

(56) References Cited

U.S. PATENT DOCUMENTS

| | | |
|---|---|---|
| 3,979,717 A | 9/1976 | Barnum et al. |
| 4,748,569 A | 5/1988 | Gordon |
| 4,887,087 A | 12/1989 | Clearwater |

(Continued)

FOREIGN PATENT DOCUMENTS

| | | |
|---|---|---|
| EP | 1160541 A1 | 12/2001 |
| EP | 2187372 A1 | 5/2010 |

(Continued)

OTHER PUBLICATIONS

Cesetti et al., "Autonomous Safe Landing of a Vision Guided Helicopter," Mechatronics and Embedded Systems and Applications (MESA), IEEE, Jul. 15-17, 2010, 6 pp.

(Continued)

*Primary Examiner* — Vu Le
*Assistant Examiner* — Guillermo Rivera-Martinez
(74) *Attorney, Agent, or Firm* — Shumaker & Sieffert, P.A.

(57) ABSTRACT

A camera-based obstacle detection system includes a first camera, a second camera, and one or more processors configured to acquire a first image from the first camera, acquire a second image from the second camera, determine a depth of an object based on a location of the object in the first image relative to a location of the object in the second image, and in response to the depth exceeding a threshold depth value, generate an alert.

20 Claims, 3 Drawing Sheets

(51) Int. Cl.
*B64C 27/04* (2006.01)
*B64D 47/08* (2006.01)

(56) References Cited

U.S. PATENT DOCUMENTS

| | | |
|---|---|---|
| 5,371,581 A | 12/1994 | Wangler et al. |
| 5,465,142 A | 11/1995 | Krumes et al. |
| 5,581,250 A | 12/1996 | Khvilivitzky |
| 6,118,401 A | 9/2000 | Tognazzini |
| 6,909,381 B2 | 6/2005 | Kahn |
| 7,126,496 B2 | 10/2006 | Greene |
| 7,136,011 B2 | 11/2006 | Mork et al. |
| 7,463,183 B2 | 12/2008 | Reich |
| 7,932,838 B2 | 4/2011 | Hamza et al. |
| 8,121,786 B2 | 2/2012 | Morbey et al. |
| 8,473,189 B2 | 6/2013 | Christoph |
| 8,903,568 B1 | 12/2014 | Wang et al. |
| 8,970,423 B2 | 3/2015 | Kabrt et al. |
| 2005/0113985 A1 | 5/2005 | Greene |
| 2008/0042812 A1 | 2/2008 | Dunsmoir et al. |
| 2008/0243383 A1 | 10/2008 | Lin |
| 2010/0299067 A1 | 11/2010 | McCollough et al. |
| 2012/0029738 A1 | 2/2012 | Brunetti et al. |
| 2013/0110323 A1 | 5/2013 | Knight |
| 2013/0332062 A1 | 12/2013 | Kreitmair-Steck et al. |
| 2014/0009575 A1* | 1/2014 | Houck, II .......... H04N 13/0221 348/43 |
| 2014/0062755 A1 | 3/2014 | Kabrt et al. |
| 2014/0081567 A1 | 3/2014 | Kirk et al. |
| 2014/0142838 A1 | 5/2014 | Durand |
| 2014/0210949 A1 | 7/2014 | Berkovich et al. |
| 2015/0219426 A1 | 8/2015 | Moraites et al. |
| 2016/0070265 A1* | 3/2016 | Liu .................... B64C 39/024 701/3 |
| 2016/0117830 A1* | 4/2016 | Salahat ................ G06T 7/0097 382/154 |
| 2016/0291594 A1* | 10/2016 | Zhao ...................... G01S 17/36 |
| 2017/0010623 A1* | 1/2017 | Tang ...................... G05D 1/101 |
| 2017/0045895 A1* | 2/2017 | Wang ..................... G05D 1/101 |

FOREIGN PATENT DOCUMENTS

| | | |
|---|---|---|
| EP | 2523062 A2 | 11/2012 |
| EP | 2669706 A1 | 12/2013 |
| WO | 2008116456 A1 | 10/2008 |
| WO | 2009075648 A1 | 6/2009 |
| WO | WO 2016033797 A1 * | 3/2016 .......... B64C 39/024 |
| WO | WO 2017004799 A1 * | 1/2017 |

OTHER PUBLICATIONS

Extended Search Report from counterpart European Application No. 16180241.8, dated Dec. 8, 2016, 9 pp.

Seidel et al., "Helicopter collision avoidance and brown-out recovery with HELLAS," Laser Sensing and Systems, SPIE Proceedings, vol. 7114, Oct. 2, 2008, 2 pp. (Abstract only).

Candamo et. al., "Vision-based on-board collision avoidance system to aircraft navigation," Unmanned Systems Technology VIII, SPIE Proceedings, vol. 6230, May 9, 2006, 7 pp.

Darby et al., "Route Causes for helicopters, the journey—not the destination—holds the greatest risk," AEROSAFETYWORLD, www.flightsafety.org, Jul. 2009, pp. 47-51.

"2007 General Aviation Statistical Databook & Industry Outlook," the General Aviation Manufacturers Association, 2007, 73 pp.

"2011 General Aviation Statistical Databook & Industry Outlook," the General Aviation Manufacturers Association, 2010, 80 pp.

"EHEST Analysis of 2000-2005 European Helicopter Accidents," European Strategic Safety Initiative, European Helicopter Safety Team (EHEST), Oct. 2010, 44 pp.

"Annual Safety Review 2010," European Aviation Safety Agency, easa.europa.eu, 2010, 78 pp.

Rigsby, "Rotorcraft Operations and Statistics," Federal Aviation Administration, Aviation Human Factors and SMS Conference, retrieved from http://www.signalcharlie.net/file/view/Rigsby+-+FAASTeam+Conference+Mar+2011.pdf, Mar. 2011, 65 pp.

Gauci "Obstacle Detection in Aerodrome Areas Through the Use of Computer Vision," Cranfield University, Department of Aerospace Engineering School of Engineering, PhD Thesis, Apr. 2010, 279 pp.

Saunders et al. "Vision-based Reactive Multiple Obstacle Avoidance for Micro Air Vehicles," 2009 American Control Conference, Hyatt Regency Riverfront, St. Louis, MO, USA, Jun. 10-12, 2009, 6 pp.

U.S. Appl. No. 14/281,627, by Honeywell International Inc. (Inventors: James C. Kirk et al.), filed May 19, 2014.

Response to Extended Search Report dated Dec. 8, 2016, from counterpart European Application No. 16180241.8, filed Jun. 30, 2017, 14 pp.

* cited by examiner

HELICOPTER LANDING SYSTEM USING A CAMERA FOR OBSTACLE DETECTION

TECHNICAL FIELD

The disclosure relates to obstacle detection for aircraft, including helicopters.

BACKGROUND

According to a study of civil helicopter accidents, 61% of the accidents occurred during take-off, maneuvering, approach and landing (i.e. while flying low and slow), and 38% of the accidents were caused by a lack of adequate situational awareness by the pilot.

SUMMARY

This disclosure describes example camera-based obstacle detection systems that may be used on various aircraft. In one example, a helicopter alert system includes a first camera; a second camera; and one or more processors configured to acquire a first image from the first camera, acquire a second image from the second camera, determine a depth of an object based on a location of the object in the first image relative to a location of the object in the second image, and in response to the depth exceeding a threshold depth value, generate an alert.

In another example, a method includes acquiring a first image from a first camera; acquiring a second image from a second camera; determining a depth of an object based on a location of the object in the first image relative to a location of the object in the second image; and in response to the depth exceeding a threshold depth value, generating an alert.

The details of one or more examples are set forth in the accompanying drawings and the description below. Other features, objects, and advantages will be apparent from the description and drawings, and from the claims.

DETAILED DESCRIPTION

This disclosure describes example camera-based obstacle detection systems that may be used on various aircraft. The camera-based obstacle detection systems of this disclosure may each be of particular benefit to aircraft such as helicopters, tilt-rotor aircraft, blimps, hot air balloons, and other types of aircrafts configured to fly at relatively low to moderate speeds in a predominantly vertical (i.e., up and down relative to ground) direction. A camera-based obstacle detection system as described herein can be used during relatively low-altitude operations to help the aircraft pilot(s) stay apprised of obstacles with which the aircraft may collide during the low-altitude operations (e.g., during take-off, landing, low-altitude hovering, and the like). The obstacles can include, for example, another aircraft, a ground vehicle, an airport or heliport structure, a tree, power lines, or virtually any other type of object.

As will be explained in greater detail below, the camera-based obstacle detection system may acquire two or more images of a target area, such as an area under or above the aircraft. The two or more images may be acquired from different locations, for example, by different lenses of a stereo camera. The camera-based obstacle detection system may perform image analysis to detect objects in the two or more images of the target area. The camera-based obstacle detection system may also calculate disparity values for the objects. A disparity value for an object generally refers to the difference in location, in units of pixels for example, of the object from a first image relative to a second image. Based on the separation between the two lenses of the stereo camera, which may be a known parameter of the stereo camera, and the disparity value of the object, the camera-based obstacle detection system can determine a depth of the object using a known disparity-to-depth conversion technique. Based on the determined depth of the object, the camera-based obstacle detection system can determine if the object is a potentially hazardous object, and if so, provide the pilot with an indication of the object on an appropriate display and/or generate other appropriate notifications (e.g., either or both of audio and visual warnings) to alert the pilot to the potentially hazardous object.

The camera-based obstacle detection system of this disclosure may be relatively inexpensive compared to existing microwave radar-based obstacle detection systems. For among other reasons, the camera-based obstacle detection system of this disclosure may be implemented using a combination of existing components with no or only limited need for special-purpose components. Moreover, the camera-based obstacle detection system of this disclosure may offer improved obstacle detection compared to radar-based obstacle detection systems. For example, radar-based systems transmit signals and then detect reflections of the transmitted signals. Thus, while radar-based objection detection systems can accurately detect larger objects and flat-surfaced objects, the radar-based detection systems often times do not adequately detect objects with small cross-sections, such as power lines or other small objects with round or cylindrical surfaces that do not produce good signal reflections.

Figure 1:
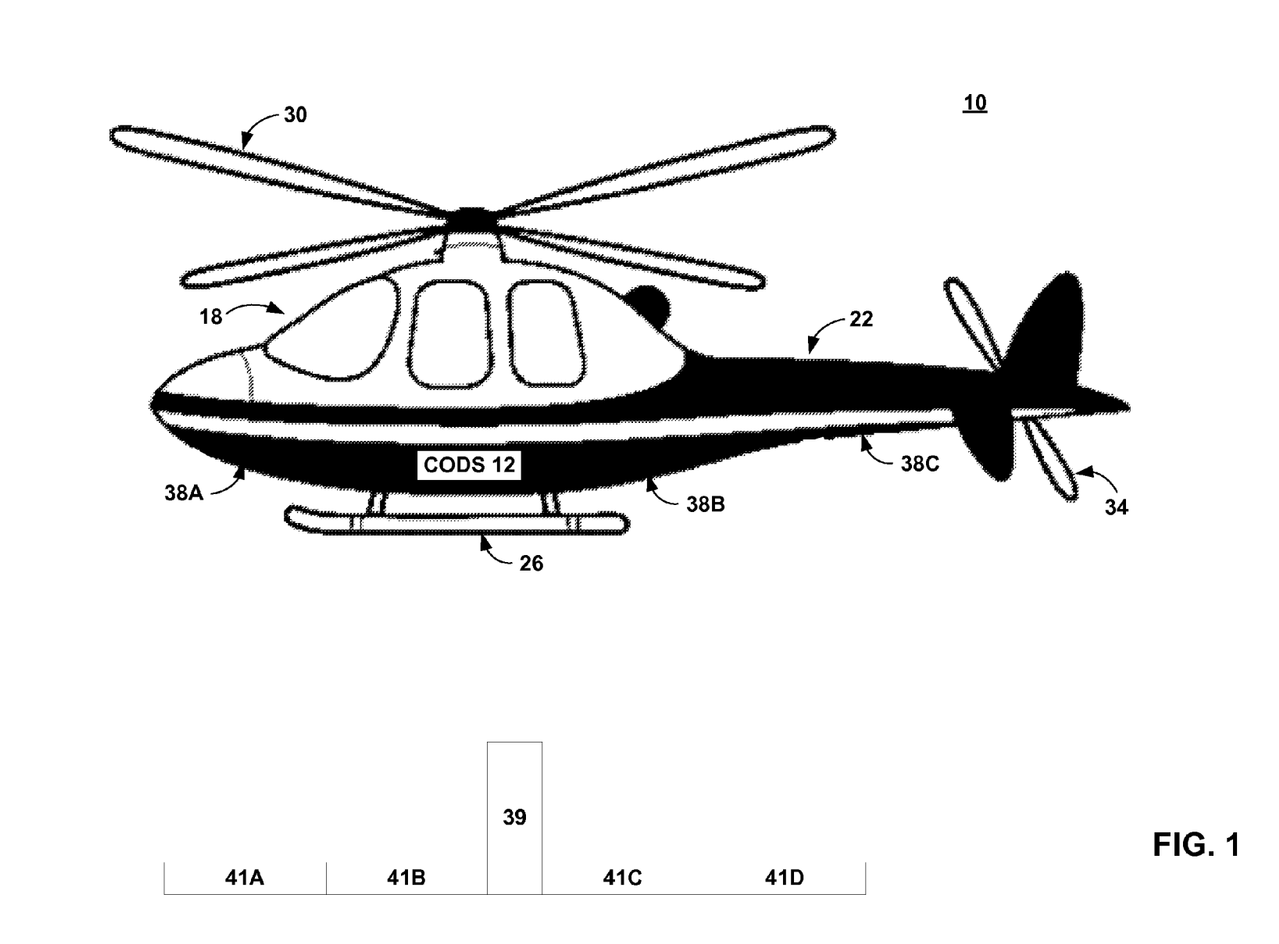
FIG. 1 is a side view of a helicopter implementing an example obstacle detection system according to the techniques of this disclosure.

FIG. 1 shows a side view of a helicopter 10 with an example camera-based obstacle detection system (CODS) 12 (also referred to herein as "system 12") configured to implement the techniques of this disclosure. Helicopter 10 includes a fuselage that includes a cabin portion 18 and a tail portion 22, a landing structure 26, such as landing skids or the like, a main rotor 30, and a tail rotor 34. Helicopter 10 is intended to represent one of the many kinds of helicopters on which system 12 may be implemented. Furthermore, although system 12 will be described in this disclosure with reference to a helicopter, it should be understood that system 12 may be implemented into other types of aircraft, and as mentioned above, may be of particular benefit to aircraft configured to maneuver at relatively low to moderate speeds in a predominantly vertical direction.

System 12 includes a plurality of cameras 38A-38C (cameras 38) mounted to the underside of helicopter 10. Cameras 38 may be located at any suitable place on helicopter 10. In the example of FIG. 1, camera 38A is mounted towards the front, underside of cabin portion 18, and camera 38B is mounted to a back, underside portion of cabin portion 18. Camera 38C is mounted to an underside of tail portion 22. In other implementations, system 12 may include a greater or fewer number of cameras than the three cameras shown in FIG. 1. The inclusion of more cameras in system 12 may, however, improve imaging by delivering multiple perspectives, which may further improve the ability to accurately detect the distance to obstacles. Furthermore, although this disclosure generally describes examples with respect to cameras located on the bottom of a helicopter (e.g., the surface of helicopter 18 configured to face a surface when helicopter 10 is taking off from the surface), which may be used for landing, it is also contemplated that cameras may be mounted on the top of a helicopter which may, for example, be used during takeoff.

In some examples, any or all of cameras 38A-38C may be stereoscopic cameras that include at least two separate lenses with each lens having a separate image sensor. In other examples, any or all of cameras 38A-38C may be monoscopic cameras. Regardless of whether stereoscopic or monoscopic, cameras 38 may acquire images in any of a red/green/blue (RGB) format, a luminance-chrominance (YCbCr) format a monochrome format, or any other color format. Additionally, any or all of cameras 38A-38C may be thermographic (e.g. infrared) cameras, where the value of a pixel in an acquired image represents a measured temperature as opposed to a color value. The various image processing techniques described below are equally applicable to both thermographic images and color-formatted images.

In addition, cameras 38 may have any suitable frame rate for detecting and tracking objects, such as, but not limited to, about 5 frames per second to about 60 frames per second. In some examples, the frame rate is selected to provide system 12 with framing updates adequate to account for changes in altitude of helicopter 10 and to provide adequate response time to the pilot, e.g., to maneuver helicopter 10 to avoid a detected object. Moreover, cameras 38 may use any resolution suitable for calculating depth and disparity values. Higher resolution cameras may allow for more accurate estimates of depth values but may also increase the computational complexity associated with finding the depth values. As images acquired by cameras 38 may be used for performing obstacle detection without being displayed, parameters for cameras 38 such as frame rate, resolution, and distance between lenses may be optimized for object detection purposes as opposed to being optimized for display purposes.

Each of cameras 38 may be oriented relative to helicopter 10 such that any objects that may be a potential collision hazard (also referred to herein as a "threat") to the particular structure of helicopter 10 on which the camera is mounted falls within the field of view (FOV) of cameras 38. In some implementations, multiple cameras may have different FOVs, such that the combined FOV of all cameras covers a desired target area. Additionally or alternatively, multiple cameras may have overlapping FOVs in order to provide redundancy. For example, in some implementations, cameras 38 may include both thermographic and non-thermographic cameras that have overlapping FOVs. In the example of FIG. 1, cameras 38 may be oriented such that the combined FOV of all of cameras 38 extends beyond the perimeter of the surface of the area covered by the helicopter, including beyond the circumference of main rotor 30 when main rotor 30 is rotating.

The numbers of cameras used in system 12 and the positioning of cameras in system 12 may be selected such that obstacles are detected in an entire space around helicopter 10. For example, the cameras may be positioned such that the combined FOV of the cameras cover a sphere, oval, or other such shape, where the helicopter is positioned at the center of the shape, and the boundaries of the shape extend beyond the space directly under helicopter 10. In other examples, the cameras may be positioned such that a combined FOV of the cameras only covers the area directly under helicopter 10 or a portion of the area directly under helicopter 10.

In some operational situations, helicopter 10 may be descending upon or approaching an obstacle or hazard. For example, structure 39 located below helicopter 10 may be an obstacle that should be avoided. Structures 41A-41D represent the surface surrounding structure 39 and may, for example, form a landing pad. Structure 39 is intended to represent any type of structure which may potentially be a threat to helicopter 10. In such an operational situation, system 12 may obtain a first image captured by one of cameras 38A-38C and obtain a second image captured by one of cameras 38A-38C. In some example implementations, the first and second images may be captured by first and second lenses of a stereoscopic camera (e.g., two or more of the cameras 38A-38C may be part of a common stereoscopic camera). In other examples, the first and second images may be captured by two different monoscopic cameras. If captured by two different monoscopic cameras, system 12 may be configured to synchronize the capturing of the first and second images, such that the two monoscopic cameras capture the first and second images at the same time or substantially close to the same time. Thus, the two monoscopic cameras may be configured to be functionally equivalent to a stereoscopic camera.

System 12 may detect in the first image and the second image an object corresponding to structure 39. System 12 may, for example, detect the object using a known object detection technique, such as by identifying boundaries of objects based on large differences in pixel values between adjacent pixels. In other implementations, the objects detected by system 12 may not correspond to actual objects determined in the images, but instead may be artificially determined by, for example, dividing the image into blocks of pixels. System 12 may determine a disparity value for the object in the first image relative to the second image. The disparity value represents an offset of the location of the object in the first image relative to the location of the object in the second image. System 12 may, for example, determine a disparity value for some or all pixels in the object and select as the disparity value for the object, the average of the determined disparity values, a maximum of the determined disparity values, a minimum of the determined disparity values, a mode of the determined disparity values, or determine a disparity value based on some other criteria. The disparity value may, for example, be determined in units of pixels.

Based on the disparity value for the object, system 12 may determine a depth value for the object The depth value may be correlated to a distance between the cameras used to acquire the image and the object. In response to the depth value exceeding a threshold, system 12 may generate an alert (e.g. one or both of an audio or visual alert) and transmit the alert to an alert delivery subsystem which may, for example, be inside cabin portion 18, such that the alert will be received by a pilot of helicopter 10. The alert may, for example, be an indication on a display, and audible alarm, or other such notification.

System 12 may, for example, be configured to utilize a threshold value that causes an alert to be sent to the pilot while helicopter 10 is still sufficiently far enough away from structure 39 that the pilot has time to assess the threat of structure 39 and take corrective action if needed. In some examples, the distance between helicopter 10 and structure 39 at which system 12 generates an alert may be a user, selectable parameter, such that an operator of system 12 (e.g. a pilot) can determine their own sensitivity level for receiving alerts. Additionally or alternatively, the threshold value utilized by system 12 may be modified to account for the different body styles of aircraft in which system 12 may be installed. In the example of helicopter 10, the lowest point of helicopter 10 (e.g. landing structure 26) may be approximately a meter below any of cameras 38, but in other aircraft the distance between the cameras and the lowest point of the aircraft may be greater or less. The threshold distance at which system 12 generates an alert may be modified to account for these differences.

System 12 may determine the depth value based on the determined disparity value, as well as based on a sensor separation value between the first camera and the second camera. In the case where the first camera and the second camera are a stereoscopic camera, then the sensor separation value may be a known parameter of the stereo camera. In the case where the first camera and the second camera are two different monoscopic cameras, then the sensor separation value may be measured at the time of installation. Regardless of whether a stereo camera or two monoscopic cameras are used, it is contemplated that in some implementations system 12 will be pre-programmed with the sensor separation value, such that at the time of use, the sensor separation value will be a known parameter as opposed to a calculated parameter.

To distinguish an object that is a threat from an object that is not a threat, system 12 may determine depth values for a plurality of objects in the first and second images and compare the depth values for the plurality of objects to determine how similar or how different the various depth values are. Typically, depth values that are the same or nearly the same indicate objects that are at equal depths, which is typically not indicative of a threat. Referring to FIG. 1, objects 41A and 41C may be a portion of a landing pad that are painted yellow, while objects 41B and 41D may be portions of a landing pad that are not painted. In analyzing a first and second image, system 12 may identify objects 41A, 41B, 41C, and 41D as being separate objects, but because all of objects 41A-41D have the same or nearly the same depth values, system 12 may determine that none of objects 41A-41D constitute a threat. Structure 39, by contrast, has a depth value that is different than objects 41A-41D, and thus may constitute a threat.

System 12 may compare the depth value of one or more objects in the first and second images to depth values of other objects in the first and second images, and in response to a difference between the depth values of any two objects being greater than a threshold value, system 12 may determine one of the objects to be a threat. This threshold value represents a variance in the depths of objects in the acquired first and second images, with a variance higher than the threshold variance being indicative of an object being a threat. Typically, a safe landing surface is relatively flat, and thus, the variance of depth values determined for two images of the landing surface will be relatively small.

It is contemplated that system 12 and cameras 38 may be either built into helicopter 10 or may be an after-market product. In an implementation where system 12 is built into helicopter 10, then system 12 and cameras 38 may, for example, be added to helicopter 10 at the time of manufacture and may be highly integrated with other systems of helicopter 10. For instance, the alert-delivery subsystem that delivers the alert in response to detecting a threat may be built into the main instrumentation panel of helicopter 10. In an implementation where system 12 is an after-market product, then system 12 and cameras 38 may be retrofitted to helicopter and be less integrated with other systems of helicopter 10. For instance, the alert-delivery subsystem may be separate from the main instrumentation panel of helicopter 10. In some implementations, the alert-delivery subsystem may be a personal computing device, such as a smartphone, tablet computer, or laptop computer that is in communication with system 12. In other implementations, system 12 may be a program or application being executed by the personal computing device, and the personal computing device may be in communication with cameras 38.

If built into helicopter 10, it is contemplated that system 12 and cameras 38 may be powered by a power source, such as a battery and/or alternator that also powers other systems of helicopter 10. If an after-market product, it is contemplated that system 12 and cameras 38 may still be powered by a power source of helicopter 10, but it also contemplated that system 12 and cameras 38 may utilize their own dedicated power source, such as a battery.

Figure 2:
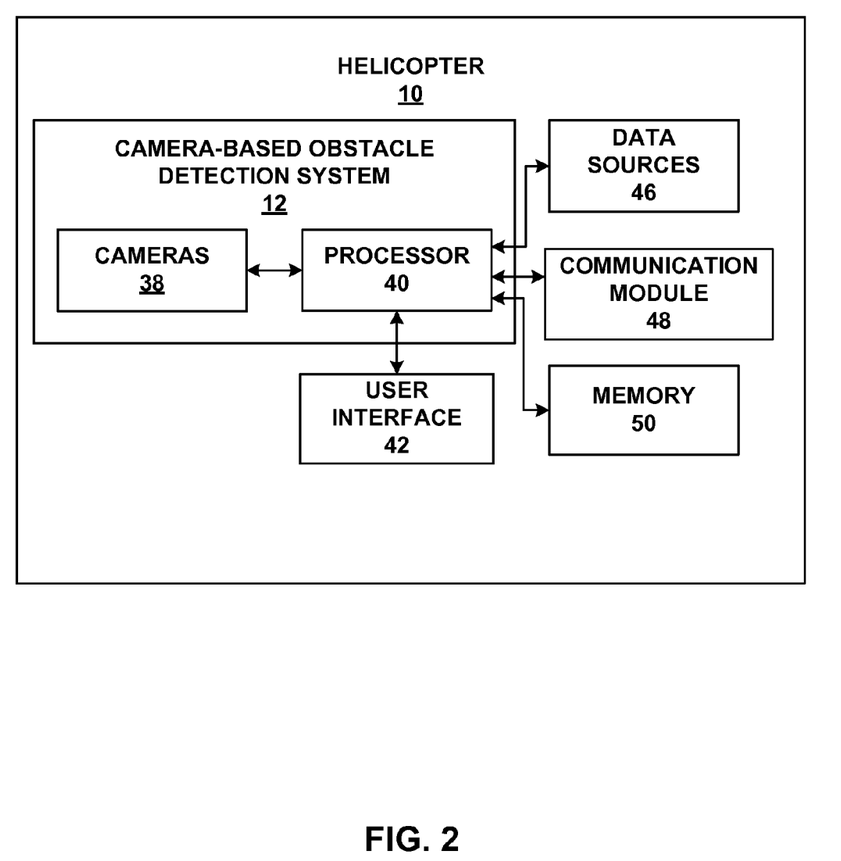
FIG. 2 is a block diagram illustrating another example of a helicopter that includes an example camera-based obstacle detection system configured to detect one or more objects proximate to the helicopter and present information regarding the detected one or more obstacles.

FIG. 2 is a block diagram illustrating various components of helicopter 10. In the example of FIG. 2, helicopter 10 includes camera-based obstacle detection system 12 configured to detect one or more objects proximate to helicopter 10 and present information to a flight crew (e.g., a pilot) regarding the detected one or more obstacles. The obstacles can include, for example, another aircraft, a ground vehicle, a heliport structure, a tree, power lines, or virtually any other type of object.

In the example shown in FIG. 2, ground obstacle detection system 12 includes cameras 38 and processor 40, and helicopter 10 further includes user interface 42, one or more data sources 46, communications module 48, and memory 50. The configuration of helicopter 10 and ground obstacle detection system 12 shown in FIG. 2 is merely one example. In other examples, helicopter 10 and ground obstacle detection system 12 can include different components. In addition, in some examples, ground obstacle detection system 12 and other aircraft systems may share resources. For example, in the example shown in FIG. 2, user interface 42, one or more data sources 46, communications module 48, and memory 50 are a part of ground obstacle detection system 12 and one or more other systems of aircraft 12.

Although system 12 is shown to be onboard helicopter 10, in other examples, a portion of system 12 or the entire system 12 can be located external to helicopter 10. For example, a processor may be located external to helicopter 10 and may perform any part of the functions attributed to processor 40 herein. Also, cameras 38 may be located external to the aircraft, or one or more cameras may be located on the aircraft with one or more additional cameras located externally for multi-perspective imaging, which may further improve the ability to accurately detect the size and shape of obstacles.

Processor 40, as well as other processors disclosed herein, may comprise any suitable arrangement of hardware, software, firmware, or any combination thereof, to perform the techniques attributed to processor 40 herein. For example, processor 40 may include any one or more microprocessors, digital signal processors (DSPs), application specific integrated circuits (ASICs), field programmable gate arrays (FPGAs), or any other equivalent integrated or discrete logic circuitry, as well as any combinations of such components. Memory 50 includes any volatile or non-volatile media, such as a random access memory (RAM), read only memory (ROM), non-volatile RAM (NVRAM), electrically erasable programmable ROM (EEPROM), flash memory, and the like. Memory 50 may store computer readable instructions that, when executed by processor 40, cause processor 40 to perform the techniques attributed to processor 40 herein.

User interface 42 of FIG. 2 may, for example, be part of the alert-delivery subsystem referenced in the description of FIG. 1. User interface 42 is configured to present information regarding one or more detected objects to a user of system 12. A user of system 12 may, for example, be a pilot of helicopter 10, another flight crew member, or may be located remotely from helicopter 10, such as at a ground control station. User interface 42 includes a display device, which can be, for example, one or more of a liquid crystal display (LCD) or a light emitting diode (LED) display configured to present visual information to the user. The display device can be provided by any suitable device, such as, for example, one or more of a computing device (such as a laptop computer, tablet computer or smartphone), an electronic flight bag (EFB), a primary flight display (PFD), a multifunction display (MFD), a navigation display, or any other suitable device that includes a display. The display can be a head-up display, a head-down display, a head-mounted display or any other display capable of presenting graphical information to a user.

In addition, in some examples, user interface 42 may include a speaker configured to deliver audible information, a sensory device configured to deliver information via a somatosensory alert, or any combination thereof. User interface 42 may also be configured to receive input from a user. For example, user interface 42 may include one or more of a keypad, buttons, a peripheral pointing device or another input mechanism that allows the user to provide input. The buttons may be dedicated to performing a certain function, e.g., receiving user input indicative of a specific type of input, or the buttons and the keypad may be soft keys that change in function depending upon the section of a display currently viewed by the user. In some examples, the display device of user interface 42 may be a touch screen display configured to receive the input from a user.

While user interface 42 may in some implementations be configured to show a video feed from one or more of cameras 38, it is contemplated that user interface 42 need not necessarily show a video feed from one of cameras 38. Instead, in response to detecting an object that may be a threat, user interface 42 may deliver an alert in the form of a warning light, an audible alarm, somatosensory alert (e.g., a vibration sensed by the user) or the like. In some examples, the images captured by camera 38 may not be utilized for display, and, in these examples, the image acquisition parameters (e.g. frame rate, resolution, etc.) do not need to be optimized for viewing. Additionally, the image processing techniques used for determining depth and disparity values may potentially be simplified relative to the techniques utilized for video that is intended to be displayed via a display of user interface 42.

Processor 40 is configured to send and receive information over a data channel via communications module 48, which may include a transponder, a transmitter, or any combination thereof. For example, processor 40 may be configured to send, receive, or both send and receive data from data sources external to helicopter 10, such as from other vehicles and ground-based systems. The data received by processor 40 can include, far example, information indicative of objects proximate to helicopter 10. Examples of data that can be received from sources external to helicopter 10 include, but are not limited to, data indicating the position and, in some cases, the velocity, of other aircraft on the ground, such as automatic dependent surveillance-broadcast or broadcast/traffic information service-broadcast (ADS-B/TIS-B) data received from other aircraft or ground vehicles, data transmitted by an airport or airline and indicating the position of other vehicles/aircraft/obstacles (e.g., received by helicopter 10 via a Worldwide Interoperability for Microwave Access (WiMAX)), or any combination thereof.

Processor 40 is configured to receive video data from cameras 38 and, in some cases, may be configured to control cameras 38. The communicative coupling between processor 40 and cameras 38 may be, for example, a data bus, a direct connection, or any other wired or wireless communication interface. As mentioned above, in some implementations, processor 40 may be a component of a personal computing device such as a smartphone, tablet computer, or laptop computer.

Cameras 38 may capture first and second images that are images of the same field of view but from slightly different perspectives. Processor 40 may identify a first group of pixels in the first image and identify a second group of pixels in the second image. The second group of pixels may correspond to the first group of pixel in the first image, meaning the first group of pixels and the second group of pixels may show the same object, and thus have the same pixel values. Processor 40 may locate the second group of pixels in the second image by searching for a group of pixels with pixel values that match the first group of pixels. Processor 40 may determine a disparity value for the first group of pixels in the first image relative to the second group of pixels in the second image. Based on the disparity, processor 40 may determine a depth value for the object, and in response to the depth value exceeding a depth threshold, generate an alert. The alert may be delivered via user interface 42.

In addition to being dependent on a depth value of the object, whether or not processor 40 generates an alert may also be dependent on a difference between the depth value of the object and depth values of other objects in the first and second images. In response to a difference between the depth values of two objects being greater than a depth variance threshold and in response to the depth value exceeding the depth threshold, processor 40 may generate the alert.

Processor 40 is also configured to receive data from, and, in some cases, control, one or more data sources 46 onboard helicopter 10. The communicative coupling between processor 40 and one more data sources 46 may be, for example, a data bus, a direct connection, or any other wired or wireless communication interface. In some examples, one or more data sources 46 may be configured to generate data indicative of a location of helicopter 10. In these examples, one or more data sources 46 may include GPS, inertial navigation system (INS), or another positioning system configured to indicate the location of helicopter 10. The location of helicopter 10 indicated by the data from one or more data sources 46 may be the geographic location (e.g., latitude and longitude) of helicopter 10, the location of helicopter 10 relative to one or more landmarks, or any combination thereof. In addition, or instead, one or more data sources 46 may include a maps database, which stores a plurality of maps that indicate the location (e.g., by global coordinates) of ground structures, such as airport buildings, towers, airport signage and the like on the airport ground surface.

Processor 40 may, for example, utilize information from data sources 46 in determining if an object is a threat and if an alert should be generated. As one potential example, processor 40 may, for example, determine a rate at which helicopter 10 is ascending or descending. When helicopter 10 is ascending or descending rapidly, processor 40 may increase the depth threshold at which alerts are generated, thus sending alerts at greater distances between helicopter 10 and a potential threat and allowing an operator of helicopter 10 more time to take corrective measures. When helicopter 10 is ascending or descending more slowly, the extra time afforded by sending the alert at a greater distance may not be needed, and thus processor 40 may decrease the depth threshold at which alerts are generated.

In some examples, processor 40 can be configured to determine the location of one or more objects known to not be collision hazards for helicopter 10 (e.g., based on the height of the objects) by referencing the present location of helicopter 10 (as indicated by one or more data sources 46) to a maps database. Processor 40 can then, for example, determine a detected object is not a threat to helicopter 10 in response to determining the detected object is one of the objects known to not be collision hazards for helicopter 10.

Figure 3:
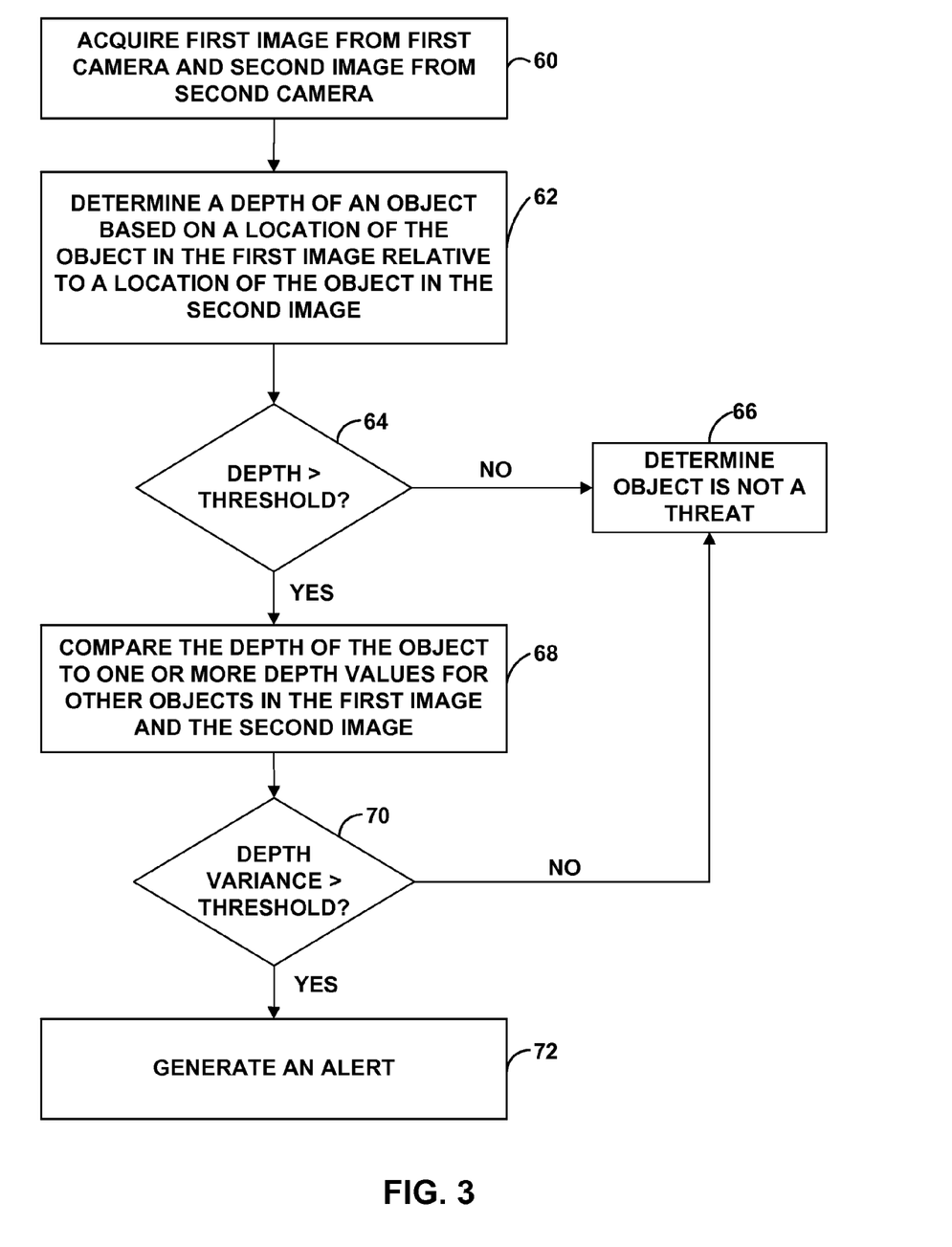
FIG. 3 is a flow diagram of an example technique for generating an alert in response to detecting a potential threat.

FIG. 3 is a flow diagram showing example techniques for determining if a detected object is a threat. For ease of description, the techniques shown in FIG. 3 are described with respect to system 12 of FIGS. 1 and 2. System 12 acquires a first image from a first camera and acquires a second image from a second camera (60). System 12 (e.g. processor 40 in communication with other components shown in FIG. 2) determines a depth of an object based on a location of the object in the first image relative to a location of the object in the second image (62). In response to the depth exceeding (e.g. being greater than) a threshold depth value ("NO" branch of block 64), system 12 may determine that the object is not a threat (66), and thus, not generate an alert. In response to the depth exceeding (e.g. being less than) a threshold depth value ("YES" branch of block 64), system 12 may compare the depth of the object to one or more depth values for other objects in the first image and the second image (68). In response to a difference between the depth value of the first object and a depth value of the one or more depth values being less than a depth variance threshold ("NO" branch of block 70), system 12 may determine the object is not a threat (66). In response to a difference between the depth value of the first object and a depth value of the one or more depth values being greater than a depth variance threshold ("YES" branch of block (70), system 12 may determine the object is potentially a threat and generate an alert (72).

It should be appreciated that the arrangement of steps shown in FIG. 3 is only one example arrangement and that the steps may be performed in different orders. As one example, steps 68 and 70 may be performed before steps 62 and 64 rather than after. Moreover, it should be appreciated that certain steps may be omitted. As one example, steps 62 and 64 may be omitted such that system 12 determines if an object is a threat only based on the variance of the depth values determined for the first and second images, or steps 68 and 70 may be omitted such that system 12 determines if an object is a threat only based on the depth of the object.

Throughout this disclosure certain techniques have been described with respect to depth or with respect to disparity. Depth and disparity are inversely proportional values, with a small disparity typically corresponding to a large depth, and vice versa. Accordingly, unless otherwise explicitly stated, any technique described with respect to disparity may also be performed using depth, and any technique described with respect to depth may also be performed using disparity.

As one example, block 64 of FIG. 3 describes determining if a depth value is greater than a threshold value. This determination may be made by determining if the depth value is greater than the threshold value, but this determination may also be made by determining if a disparity value is less than a threshold. As another example, block 70 of FIG. 3 describes determining if a depth variance is greater than a threshold. This determination may be made by determining if the depth variance is greater than a threshold, but this determination may also be made by determining if a disparity variance is greater than a threshold.

The techniques of this disclosure may be implemented in a wide variety of computer devices. Any components, modules or units have been described provided to emphasize functional aspects and does not necessarily require realization by different hardware units. The techniques described herein may also be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset.

If implemented in software, the techniques may be realized at least in part by a computer-readable medium comprising instructions that, when executed in a processor, performs one or more of the methods described above. The computer-readable medium may comprise a tangible computer-readable storage medium and may form part of a larger product. The computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The computer-readable storage medium may also comprise a non-volatile storage device, such as a hard-disk, magnetic tape, a compact disk (CD), digital versatile disk (DVD), Blu-ray disk, holographic data storage media, or other non-volatile storage device.

The term "processor," as used herein may refer to any of the foregoing structure or any other structure suitable for implementation of the techniques described herein. In addition, in some aspects, the functionality described herein may be provided within dedicated software modules or hardware modules configured for performing the techniques of this disclosure. Even if implemented in software, the techniques may use hardware such as a processor to execute the software, and a memory to store the software. In any such cases, the computers described herein may define a specific machine that is capable of executing the specific functions described herein. Also, the techniques could be fully implemented in one or more circuits or logic elements, which could also be considered a processor.

Various examples have been described. These and other examples are within the scope of the following claims.

What is claimed is:
1. A helicopter alert system comprising:
a first camera;
a second camera; and
one or more processors configured to:
 acquire a first image from the first camera,
 acquire a second image from the second camera, determine a depth value of a first object based on a disparity between a location of the first object in the first image and a location of the first object in the second image;

determine a depth value of a second object based on a disparity between a location of the second object in the first image and a location of the second object in the second image;

determine a difference between the depth value of the first object and the depth value of the second object, wherein the difference between the depth value of the first object and the depth value of the second object comprises a depth variance; and in response to the difference between the depth value of the first object and the depth value of the second object exceeding a depth variance threshold value, generate an alert.

2. The helicopter alert system of claim 1, wherein the one or more processors are configured to determine the depth value of the first object by:

identifying a first group of pixels in the first image, wherein the first group of pixels corresponds to at least a portion of the first object, identifying a second group of pixels in the second image, wherein the second group of pixels corresponds to the first group of pixels in the first image, determining a disparity between a location of the first group of pixels in the first image and a location of the second group of pixels in the second image, and based on the disparity between the location of the first group of pixels in the first image and the location of the second group of pixels in the second image, determining the depth value of the first object.

3. The helicopter alert system of claim 1, wherein the one or more processors are further configured to:

determine a rate at which the helicopter is ascending or descending;

adjust the depth variance threshold based in part on the rate at which the helicopter is ascending or descending.

4. The helicopter alert system of claim 1, wherein the first camera and the second camera comprise a stereo camera.

5. The helicopter alert system of claim 1, wherein the first camera and the second camera each comprise one or more thermographic cameras.

6. The helicopter alert system of claim 1, wherein the first camera and the second camera each comprise one or more monochromatic cameras.

7. The helicopter alert system of claim 1, wherein the alert comprises an audio alert.

8. The helicopter alert system of claim 1, wherein the alert comprises a visual alert.

9. The helicopter alert system of claim 1, further comprising a smartphone, a tablet computer, or a laptop computer comprising the one or more processors.

10. The helicopter alert system of claim 1, wherein the one or more processors are configured to wirelessly communicate with the first camera and the second camera.

11. A method comprising:
acquiring a first image from a first camera;
acquiring a second image from a second camera;
determining a depth value of a first object based on a disparity between a location of the first object in the first image and a location of the first object in the second image; and determining a depth value of a second object based on a disparity between a location of the second object in the first image and a location of the second object in the second image;

determining a difference between the depth value of the first object and the depth value of the second object, wherein the difference between the depth value of the first object and the depth value of the second object comprises a depth variance; and in response to the difference between the depth value of the first object and the depth value of the second object exceeding a depth variance threshold value, generating an alert.

12. The method of claim 11, wherein determining the depth value of the first object comprises:

identifying a first group of pixels in the first image, wherein the first group of pixels corresponds to at least a portion of the first object;

identifying a second group of pixels in the second image; wherein the second group of pixels corresponds to the first group of pixels in the first image;

determining a disparity between a location of the first group of pixels in the first image and a location of the second group of pixels in the second image; and based on the disparity between the location of the first group of pixels in the first image and the location of the second group of pixels in the second image, determining the depth value of the first object.

13. The method of claim 11, further comprising:
determining a rate at which the helicopter is ascending or descending;
adjusting the depth variance threshold based in part on a rate at which the helicopter is ascending or descending.

14. The method of claim 11, wherein the first camera and the second camera each comprise a stereo camera.

15. The method of claim 11, wherein the first camera and the second camera each comprise one or more thermographic cameras.

16. The method of claim 11, wherein the first camera and the second camera each comprise one or more monochromatic cameras.

17. The method of claim 11, wherein the alert comprises an audio alert.

18. The method of claim 11, wherein the alert comprises a visual alert.

19. The helicopter alert system of claim 1, wherein the one or more processors are further configured to:

wherein to determine the difference between the depth value of the first object and the depth value of the second object, the one or more processors are configured to compare the disparity between the location of the first object in the first image and the location of the first object in the second image to the disparity between the location of the second object in the first image and the location of the second object in the second image.

20. The method of claim 11,
wherein determining the difference between the depth value of the first object and the depth value of the second object comprises comparing the disparity between the location of the first object in the first image and the location of the first object in the second image to the disparity between the location of the second object in the first image and the location of the second object in the second image.

* * * * *